United States Patent
Nagpal et al.

(10) Patent No.: US 8,538,963 B2
(45) Date of Patent: Sep. 17, 2013

(54) OPTIMAL PERSISTENCE OF A BUSINESS PROCESS

(75) Inventors: Abhinay R. Nagpal, Maharashtra (IN);
Sri Ramanathan, Lutz, FL (US);
Sandeep Ramesh, Elmsford, NY (US);
Gandhi Sivakumar, Victoria (AU);
Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/947,235

(22) Filed: Nov. 16, 2010

(65) Prior Publication Data

US 2012/0123984 A1    May 17, 2012

(51) Int. Cl.
*G06F 17/30* (2006.01)

(52) U.S. Cl.
USPC ............................... 707/736; 707/769

(58) Field of Classification Search
CPC ... G06F 17/30864; G06Q 10/10; G06Q 30/02
USPC ................. 707/736, 769, 999.002
See application file for complete search history.

(56) References Cited

U.S. PATENT DOCUMENTS

| | | | |
|---|---|---|---|
| 6,430,569 B1 * | 8/2002 | Bracha et al. ......................... | 1/1 |
| 6,763,397 B1 | 7/2004 | Bracha et al. | |
| 6,801,905 B2 | 10/2004 | Andrei | |
| 7,076,785 B2 | 7/2006 | Mishra et al. | |
| 7,117,507 B2 * | 10/2006 | Hostetter et al. .............. | 719/331 |
| 7,165,075 B2 * | 1/2007 | Harter et al. ................... | 707/792 |
| 7,657,505 B2 * | 2/2010 | Hejlsberg et al. ...... | 707/999.002 |
| 7,680,767 B2 * | 3/2010 | Adya et al. ............. | 707/999.002 |
| 7,702,686 B2 * | 4/2010 | Meijer et al. .................. | 707/763 |
| 7,937,405 B2 * | 5/2011 | Anderson et al. ............. | 707/770 |
| 8,160,550 B2 * | 4/2012 | Oh .............................. | 455/412.2 |
| 2002/0133643 A1 * | 9/2002 | Bracha et al. .................. | 709/332 |
| 2004/0064632 A1 * | 4/2004 | Lin ................................ | 711/100 |
| 2007/0027906 A1 * | 2/2007 | Meijer et al. .............. | 707/103 R |
| 2008/0081595 A1 * | 4/2008 | Oh .............................. | 455/412.2 |
| 2008/0154844 A1 | 6/2008 | Gao et al. | |
| 2008/0177716 A1 * | 7/2008 | Hejlsberg et al. ................. | 707/4 |

(Continued)

OTHER PUBLICATIONS

Naganna, M. R., "Fetching Strategy Implementation in J2EE application using AOP", posted Mar 30, 2009 on InfoQ website, 12 pages, accessed online at <http://www.infoq.com/articles/fetching-aop> on Feb. 21, 2013.*

(Continued)

*Primary Examiner* — Phuong Thao Cao
(74) *Attorney, Agent, or Firm* — Patrick J. Daugherty; Driggs, Hogg, Daugherty & Del Zoppo Co., LPA

(57) ABSTRACT

Embodiments of the invention provide for automatically selecting optimal fetch settings for business processes as a function of database query load and relational context by determining whether data loaded for data retrieval points is dependent upon a query result from another query process and automatically selecting an eager fetch setting if dependent upon a query result from another query process, or a lazy fetch setting if not. Usage of the data retrieval points is monitored with respect to defined units of work to define retrieval patterns and automatically update the fetch settings, including by revising selected eager fetch settings to lazy fetch settings if a datasize of a defined retrieval pattern is larger than a permissible memory resource threshold.

19 Claims, 3 Drawing Sheets

(56) References Cited

U.S. PATENT DOCUMENTS

| | | | |
|---|---|---|---|
| 2009/0077120 A1* | 3/2009 | Warrren et al. | 707/103 R |
| 2009/0216956 A1* | 8/2009 | Ekanadham et al. | 711/137 |
| 2010/0151888 A1* | 6/2010 | Baek | 455/466 |
| 2010/0306212 A1* | 12/2010 | Tsirogiannis et al. | 707/759 |
| 2011/0191309 A1* | 8/2011 | Anderson et al. | 707/705 |
| 2012/0054227 A1* | 3/2012 | Briggs et al. | 707/769 |
| 2012/0078878 A1* | 3/2012 | De Smet et al. | 707/713 |
| 2012/0084306 A1* | 4/2012 | Merritt | 707/756 |
| 2012/0117462 A1* | 5/2012 | Jacobson et al. | 715/249 |

OTHER PUBLICATIONS

Reference Guide, "Eager Fetching", 2013, 3 pages, accessed online at <http://openjpa.apache.org/builds/1.0.3/apache-openjpa-1.0.3/docs/manual/ref_guide_perfpack_eager.html> on Feb. 21, 2013.*

Briggs et al., "Accelerate Hibernate and iBATIS applications using pureQuery, Part 3: Auto-tune data fetch Strategies in Hibernate applications with pureQuery", IBM DeveloperWorks, Oct. 21, 2011, 18 pages, accessed online at <http://www.ibm.com/developerworks/data/library/techarticle/dm-1110hibernatepart3/index.html?ca=drs-> on Feb. 21, 2013.*

Pang, K, "Entity Framework—What's the difference between using include/eager loading and lazy loading", answered Aug. 17, 2010, 2 pages, accessed online at <http://stackoverflow.com/questions/3505170/entity-framework-whats-the-difference-between-using-include-eager-loading-and> on Feb. 21, 2013.*

Gonzalez, A., et al., "A Data Cache with Multiple Caching Strategies Tuned to Different Types of Locality", ICS '95, ACM, 1995, pp. 338-347.*

Wikibooks, "Java Persistence/Relationships", last modified on Dec. 21, 2012, 23 pages, accessed online at <http://en.wikibooks.org/wiki/Java_Persistence/Relationships> on May 9, 2013.*

Red Hat, Inc., Chapter 21. Improving Performance, copyright 2004, 23 pages, accessed online at <http://docs.jboss.org/hibernate/orm/3.6/reference/en-US/html/performance.html> on May 9, 2013.*

P. W. Yan and A. P. Larson, Eager Aggregation and Lazy Aggregation, Proceedings of the 21st International Conference on Very Large Data Bases, 1995, pp. 345-357.

T. Griffin and R. Hull, A Framework for Implementing Hypothetical Queries, Proceedings of the 1997 ACM SIGMOD International Conference on Management of Data, 1997, pp. 231-242.

Ken Murray & Dirk Pesch, Adaptive Radio Resource Management for GSM/GPRS Networks, Cork Institute of Technology, Grant AR/2000/36, 2007, 6 pp.

* cited by examiner

OPTIMAL PERSISTENCE OF A BUSINESS PROCESS

BACKGROUND

The present invention relates to the persistence object-relational mapping (ORM, O/RM, and O/R mapping) in computer software, a programming technique for converting data between incompatible type systems in relational databases and object-oriented programming languages.

Persistence refers to the tendency of application data to outlive an application process. Java is an object-oriented programming model expressly designed for use in the distributed environment of the Internet. (JAVA is a trademark of the Oracle Corporation in the United States or other countries.) Java enforces and can be used to create complete applications that may run on a single computer or be distributed among servers and clients in a network. It can also be used to build a small application module or applet for use as part of a web page. Applets make it possible for a web page user to interact with the page. It is generally desired that the state of some Java objects live (persist) beyond the scope of a Java Virtual Machine (JVM) which interprets byte code into code that will run on extant computer hardware, so that the same state is available later.

Object-Relational Impedance Mismatch (sometimes called a paradigm mismatch) refers to problems in working with both object models and relational database models (RDBMS). RDBMSs represent data in a tabular format (for example, a spreadsheet), whereas object-oriented languages, such as Java, represent it as an interconnected graph of objects. Loading and storing graphs of objects using a tabular relational database may result in mismatch problems; for example, an object model may have more classes than a number of corresponding tables in the database (the object model is more granular than the relational model). Further, a RDBMS defines exactly one notion of 'sameness': the primary key. Java, however, defines both object identity (a==b) and object equality (a.equals(b)).

BRIEF SUMMARY

In one embodiment, a method is provided for automatically selecting optimal fetch settings for each of a plurality of business processes as a function of database query load and relational context. The method includes identifying each of a plurality of data retrieval points enabled during a creation of a business process execution language process and determining for each via a processor whether data loaded is dependent upon a query result from another query process. Accordingly, automatic selections are made for each data retrieval point of an eager fetch setting if dependent upon a query result from another query process, or a lazy fetch setting for those not dependent upon a query result from another query. The method further includes monitoring usage of the business process execution language process data retrieval points with respect to a defined unit of work and thereby defining retrieval patterns for data retrieval point, and automatically updating the fetch settings as a function of the defined retrieval patterns by revising selected eager fetch settings to lazy fetch settings if a datasize of a defined retrieval pattern is larger than a permissible memory resource threshold.

In another embodiment, a computer system includes a processing unit, computer readable memory and a computer readable storage system. Program instructions on the computer readable storage system cause the processing unit to automatically select optimal fetch settings for each of a plurality of business processes as a function of database query load and relational context. The computer system identifies each of a plurality of data retrieval points enabled during a creation of a business process execution language process and determines for each whether data loaded is dependent upon a query result from another query process. Accordingly, automatic selections are made for each data retrieval point of an eager fetch setting if dependent upon a query result from another query process, or a lazy fetch setting for those not dependent upon a query result from another query. The computer system further monitors usage of the business process execution language process data retrieval points with respect to a defined unit of work and thereby defines retrieval patterns for data retrieval point and automatically updates the fetch settings as a function of the defined retrieval patterns by revising selected eager fetch settings to lazy fetch settings if a datasize of a defined retrieval pattern is larger than a permissible memory resource threshold.

In another embodiment, a computer program product includes program instructions to automatically select optimal fetch settings for each of a plurality of business processes as a function of database query load and relational context. The program instructions are to identify each of a plurality of data retrieval points enabled during a creation of a business process execution language process and determine for each whether data loaded is dependent upon a query result from another query process. Accordingly, automatic selections are made for each data retrieval point of an eager fetch setting if dependent upon a query result from another query process, or a lazy fetch setting for those not dependent upon a query result from another query. The computer program instructions are further to monitor usage of the business process execution language process data retrieval points with respect to a defined unit of work and thereby define retrieval patterns for data retrieval point and automatically update the fetch settings as a function of the defined retrieval patterns by revising selected eager fetch settings to lazy fetch settings if a datasize of a defined retrieval pattern is larger than a permissible memory resource threshold.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
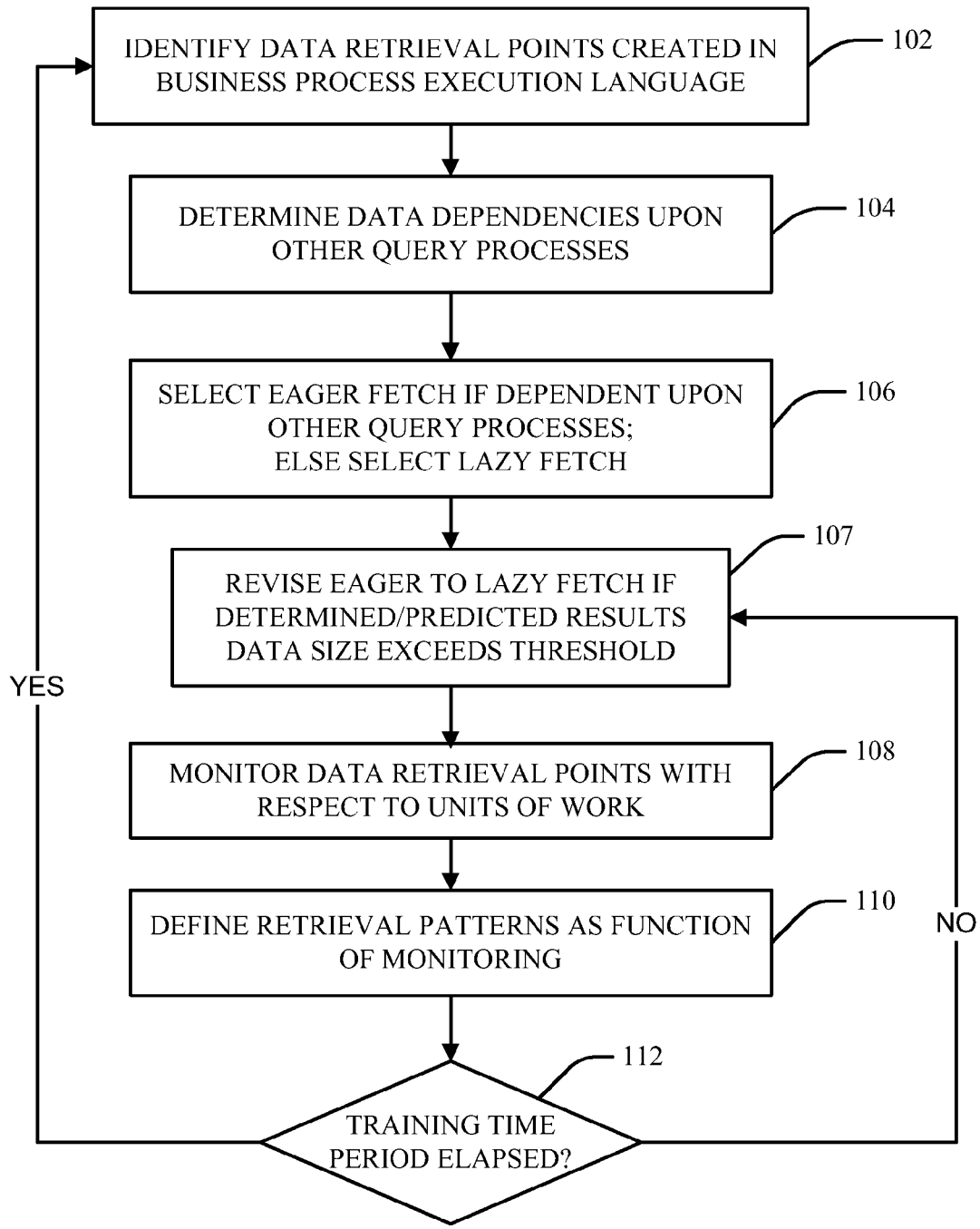
FIG. 1 provides a block diagram of a method or process of the present invention for automatically selecting optimal fetch settings for each business process as a function of database query load and relational context.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Associations in object-relational mapping (ORM) are generally "lazy" by default, wherein only required data is fetched from a database, leaving behind other, unimportant data, which is fetched only when it is required. Table 1 provides an example of domain classes and code for lazy fetching:

TABLE 1

```
class Airport {
    String name
    static hasMany = [flights:Flight]
}
class Flight {
    String number
    static belongsTo = [airport:Airport]
}
def airport = Airport.findByName("Gatwick")
airport.flights.each {
    println it.name
}
```

Applying the Table 1 code, an ORM will execute a single Structured Query Language (SQL) query to fetch the Airport instance, and then one extra query for each iteration over the flights association, thus N+1 queries. (SQL is a database computer language designed for managing data in RDBMS.) This may be an optimal result as it does not pre-fetch all referenced data from the database, but advantages gained are dependent upon a low frequency of use of the association. Thus, lazy fetching may be optimal where associated logic dictates that the association is only accessed on certain occasions. However, if the association is accessed frequently, then system demands to execute the extra queries will reduce or even exceed performance or use of resources efficiencies. Such a situation indicates that an "eager" fetch may instead be more efficient, for example, utilizing the alternative eager fetching domain class code example of Table 2 below:

TABLE 2

```
class Airport {
    String name
    static hasMany = [flights:Flight]
    static fetchmode = [flights:"eager"]
}
```

In the eager fetch case, the association will be Airport instance and the flights association will be loaded all at once (depending on the mapping). This has the benefit of requiring fewer queries, however at a higher system resource cost. For example, a large plurality of eager associations returned may occupy an undesirably large amount of a database memory, in some examples filling the database memory.

Some O/R models rely on quick assemblies of components using a mix and match of pre-existing components for new business requirements. A business process which eventually results in a service component needs to be flexible in order to absorb the changes even if it is conformant to industry standards, for example, to an e-TOM (enhanced Telecommunications Operations map), or an Analysis Process Model (APM) of an Information Framework (IFW), a tool for analyzing and structuring information. Such flexibility can be ensured by fitting in pre-defined structures at various points in the model. For example a process designed to "Activate a Customer Order" may have a current need for a sub-process to reserve a resource of a first type (for example, modem). In the future, there may be a requirement to invoke another sub-process to reserve another resource type (for example, modem spares). In current method of modeling, a designer needs to append the existing process with this new sub-process.

One problem with object/relational (O/R) mapping is that converting relational results into object results may require a lot of work. Further, because of the nature of an object-level querying and criteria system, the results returned by a query in an O/R mapping tool will potentially be much more coarse than what may be achieved via standard Java Database Connectivity (JDBC) calls, for example, with respect to tree structures. ORM libraries allow for manually setting the lazy/eager properties for each node in a global configuration file. However, determining these settings for every sub-process is a very tedious process, and often an inefficient choice is made and the wrong global setting is used.

FIG. 1 provides a block diagram of a method and apparatus according to the present invention for automatically selecting optimal fetch settings for each business process as a function of database query load and relational context. At 102 data retrieval points enabled during the static creation of a Business Process Execution Language (BPEL) process are identified in order for their fetch settings to be automatically selected from choices comprising lazy and eager fetching responsive to determining the context in which their data is loaded. More particularly, at 104 the process determines entity relationships between the respective data retrieval points, namely whether data loaded is dependent upon a query result from another query process. At 106 an eager fetch setting is automatically selected for each data retrieval point that is dependent upon a query result from another query process, else a lazy fetch setting is selected. Automatic fetch setting selections may also optionally be based upon a determination of their optimum fetch batch size, for example in some embodiments forcing a selection of a lazy fetch setting at 107 rather than an eager fetch determined at 106 if it is determined or predicted that a data size of results from the eager fetch would be larger than a specified permissible memory resource threshold. A manual configuration or override option may also be provided, at 107 or elsewhere in the process.

At 108 data usage of the business process execution language process data retrieval points is monitored with respect to a defined unit of work, and retrieval patterns are defined for each of the data retrieval points as a function of the monitoring to determine the data size of the results of the defined retrieval pattern at 110. The eager/lazy fetch settings may then be iteratively updated with respect to the determined results data size through return to the revision process at 107, and which also may further revise a fetch in response to determining other specified occurrences or condition predicates. In another aspect fetch settings may be updated by repeating the process at 112 on a periodic basis with respect to optional periodic retraining periods events. Thus, rather than using a single global configuration setting value, individual (and perhaps different) fetch selections for each process are made automatically in response to fetch data size and context, and wherein optimum fetch size for each process object is obtained and iteratively updated, enabling updated revisions to the fetch choices without requiring manual intervention.

A given business process model may comprise multiple sub-processes, each of which may include a plurality of tasks or nodes. In one example of a business process model for fulfilling a loan application, performing a "Retrieve Full Customer Details" sub-process comprises the following tasks: Retrieve Customer Details; Retrieve Arrangement Relationship Details; Retrieve Credential Details; Retrieve IP Relationship Details; and Retrieve Involved Party Score Details. If the customer details are not found in response to the Retrieve Customer Details task, then the other task results will not be found, which means the customer details need to be created in a customer database as a condition predicate. Consider a query to retrieve the customer details for an existing customer. In a lazy pattern of loading objects, a customer identifier may alone be retrieved. In order to also bring in customer name details, another query needs to be made, thus increasing time and creating a chatty interaction pattern, and accordingly an eager fetch may be indicated rather than a lazy fetch. For another of the sub-processes of the present business process example, one to "Retrieve the Credential Details," using a lazy pattern may pull out a plurality of related entities belonging to different tables, such as customer driving license information, passport information, legal reports, etc., whereas the only required fetch result may be the customer driving license information; thus, the lazy fetch may be appropriate to avoid needless utilization of system memory resources for the extraneous data that an eager fetch would bring in. Accordingly, in the present embodiment, at 102 an eager fetch is automatically selected for the first "Retrieve Customer Details" task as it always requires at least one additional query to acquire all information needed from the database; and a lazy fetch is automatically selected for the second "Retrieve the Credential Details" process, as an eager fetch would always require additional, unnecessary data that would waste memory resources.

Monitoring at 106 and responsively defining a retrieval pattern at 108 may comprise learning the pattern by performing a business process-based monitoring of data loaded by a given process and in what fetch context (additional queries always required?), as well as of data usage by the application, and again in what fetch context. Monitoring can be performed for a user-defined period of time, or until a sufficient amount of information is available.

For example, ORM libraries contain a data access layer (for example, JDBC) which is responsible for executing SQL queries to the databases. This data access layer is controlled by another layer (controller) that drives the SQL execution to load data from the RDBMS given the application specific domain model (object hierarchy) that was requested. In one exemplary application, object hierarchy first and second tables are provided: a first table called "users" and another, second table, called "user_roles." Each of the first and second tables is setup with a one-to-many relationship, meaning that one user (e.g. jsmith) can have many roles (e.g. Administrator, Auditor, Developer).

Table 3 below provides one implementation example:

TABLE 3

```
public Iterable<User> allUsers( ) {
    final String selectUsers = "select users.username, users.email, " +
        "users.last_password_change from users";
    return getJdbcTemplate( ).query(selectUsers, new Object[ ] { },
        new ParameterizedRowMapper<User>( ) {
        public User mapRow(ResultSet resultSet, int rowNumber)
throws SQLException {
            String username = resultSet.getString("username");
            String email = resultSet.getString("email");
            Date lastPasswordChange = resultSet.getDate(
"last_password_change");
            User user = new DefaultUser(username, email,
lastPasswordChange);
            addRolesToUser(user);
            return user;
        }
    });
}
private void addRolesToUser(final User user) {
    final String selectUserRoles = "select role_name from user_roles
where username = ?";
    getJdbcTemplate( ).query(selectUserRoles, new Object[ ] { user.
getPrincipalName( ) },
        new RowCallbackHandler( ) {
        public void processRow(ResultSet resultSet) throws
        SQLException {
            String rolename = resultSet.getString("role_name");
            user.addRole(rolename);
        }
    });
}
```

In application of the code of Table 3, one query is executed to retrieve the users. Problems arise in that for each user another SQL statement needs to be executed to retrieve the roles. If the first query retrieved one user, this would require one additional query to retrieve the roles. If the first query retrieved a hundred users, this would require one hundred additional queries to retrieve the roles. The pattern will always be the same, one query for the users and N queries dependent on the number of users found, thus N+1. Accordingly, an eager fetch is indicated for the first user table, unless data retrievals would be too numerous and wasteful of system resources (memory, etc.).

Figure 2:
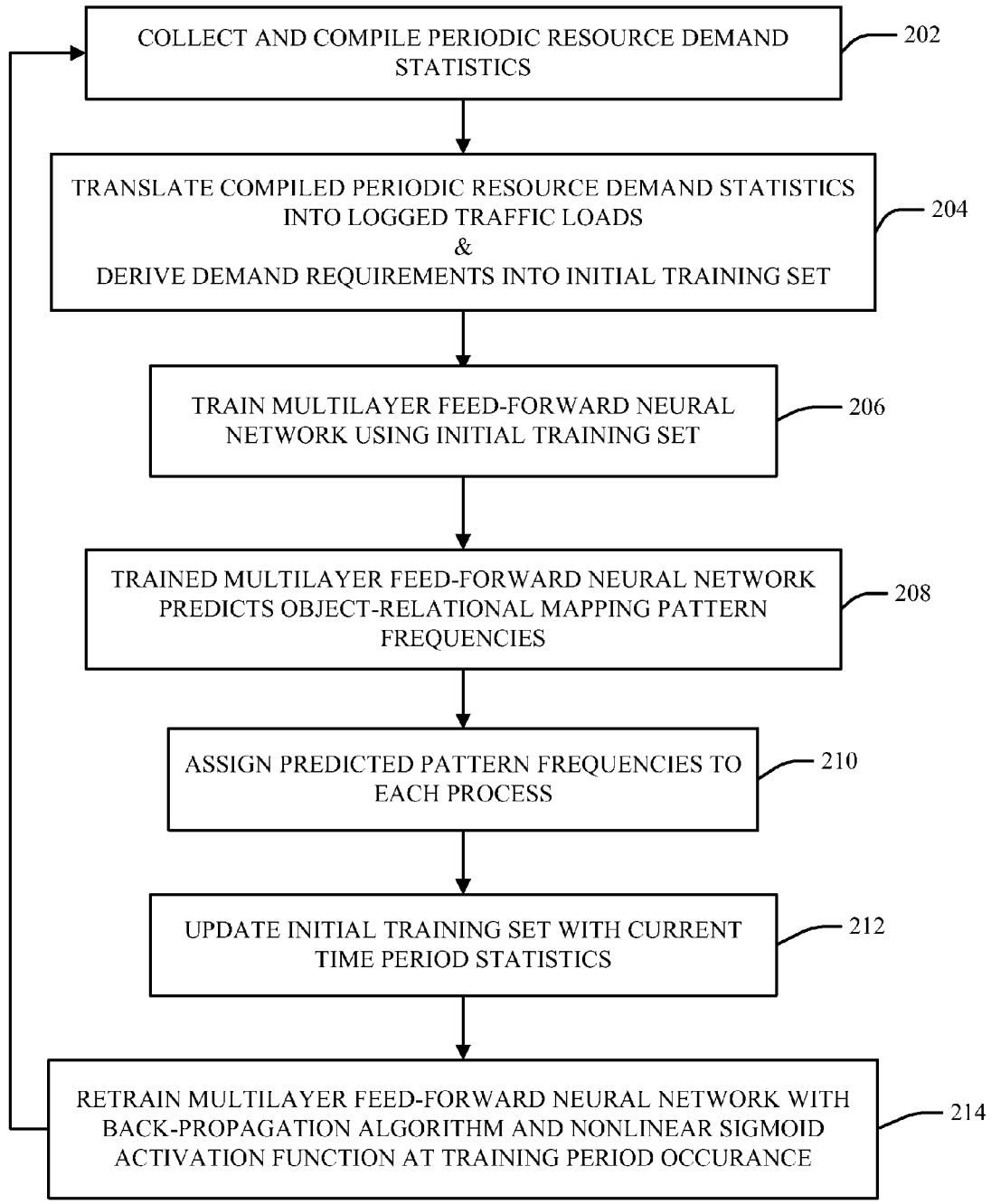
FIG. 2 provides a block diagram of a method or process for revising optimal fetch settings according to the present invention.

In another aspect, defining an optimal retrieval pattern may be a function of recognizing a number of frequencies allocated to each cell in the network, which is dependent on resource predictions. A method of prediction must be robust enough to track the inherent variations in SQL traffic (for example, hourly). FIG. 2 illustrates one embodiment of the present invention wherein a Multilayer Feed-forward Neural Network (MFNN) process is used to predict future data values (for example, at 107 and/or 110 of the process of FIG. 1) based on training sets composed of sufficient historical data, and wherein a back-propagation learning algorithm and non-linear sigmoid activation function may be used in the learning process.

Accordingly, training and prediction of an MFNN comprises:

at 202, collecting periodic resource demand statistics (for example, hourly) and compiling the collected statistics over a specified historic timeframe inclusive of the periods (for example, over a previous eight (8) weeks);

at 204, translating the compiled periodic resource demand statistics into logged traffic load measurements and deriving associated ORM demand requirements into an initial training data set comprising day and time statistics (for example, differentiating a business weekday from a weekend day, and/or a specific time-of-day time);

at 206, training the MFNN using the initial training data set;

at 208, the trained MFNN predicting ORM patterns (number of frequencies) using compiled statistics over a previous specified timeframe (for example, from a previous ten (10) hours or one (1) day);

at 210, assigning the predicted number of frequencies to each process;

at 212, updating the training set to contain statistics for a current time period (for example, a current hour); and at 214, periodically retraining the MFNN (for example, every 24 hours) to maintain accurate predictions using a back-propagation learning algorithm and a nonlinear sigmoid activation function.

In another aspect a controller layer may drive the loading of either the first table "users" or second table "user_roles" from the RDBMS and the context in which it is being loaded (i.e., is a "user" being loaded in context of a "user_role" or not, or vice versa). The result of the SQL execution will give the number of "users" or "user_roles" loaded. The controller layer also has with it the ORM session in which it is executing operations, and thus in the controller we get and log out information about the database data loaded in each session and the context in which the data is loaded (does it depend upon or call from another call).

In one embodiment of the present invention, the unit-of-work defined at 104 is a session. More particularly, the application opens (for example, "session.open method") and closes (for example, "session.close") a session to demarcate a unit-of-work, thus using the session boundaries to identify a use-case boundary. (Other unit of work examples may also be practiced, as will be appreciated by one skilled in the art.) A thread stack trace is captured at the point when the method "session.open" is invoked, and this thread stack trace is used to uniquely identify and match a business process. Accordingly, the process groups all use-case log information and new optimal settings into distinct use-cases by their thread stack trace info. If there is conflict in optimal values for different executions of a particular use-case, this may be determined through user-browsing through results, with the identified use-case handled appropriately. In this fashion, optimal ORM settings for all use-cases of the application are derived. Now that we have the optimal settings for each business process for future executions of the business process, the process uniquely matches each executing process to the tuned optimal settings that have been calculated for it, and the tuned/optimal settings are applied for the business process at the feedback points.

Optimizing fetch selection may also include selecting from other possible fetch methods, for example batch or join fetching. Batch fetching is an optimization strategy for select fetching that retrieves a batch of entity instances or collections in a single select by specifying a list of primary or foreign keys. In one example, batch fetching is enabled by: "<set name="bids" lazy="true" inverse="true" batch-size="10">," which pre-fetches the next ten (10) collections when the first collection is accessed. This reduces the lazy fetching N+1 selects problem to N/10+1 selects, which for many applications may be sufficient to achieve acceptable latency, although in some other transactions collections may still be fetched unnecessarily, and thus in some situations lazy may still be preferred over batch fetching. Join fetching is non-lazy by nature and allows associations or collections of values to be initialized along with their parent objects using a single select, effectively overriding an outer join and lazy declarations of the mapping file for associations and collections; join fetching may be an optimal choice in the case of a collection, and thus may be selected where the entity relationship to the database is a collection relationship.

Although embodiments described herein may contain terminology specific to particular ORM implementations, it will be understood that the general concepts may be applied in a variety of different ORM implementations.

Figure 3:
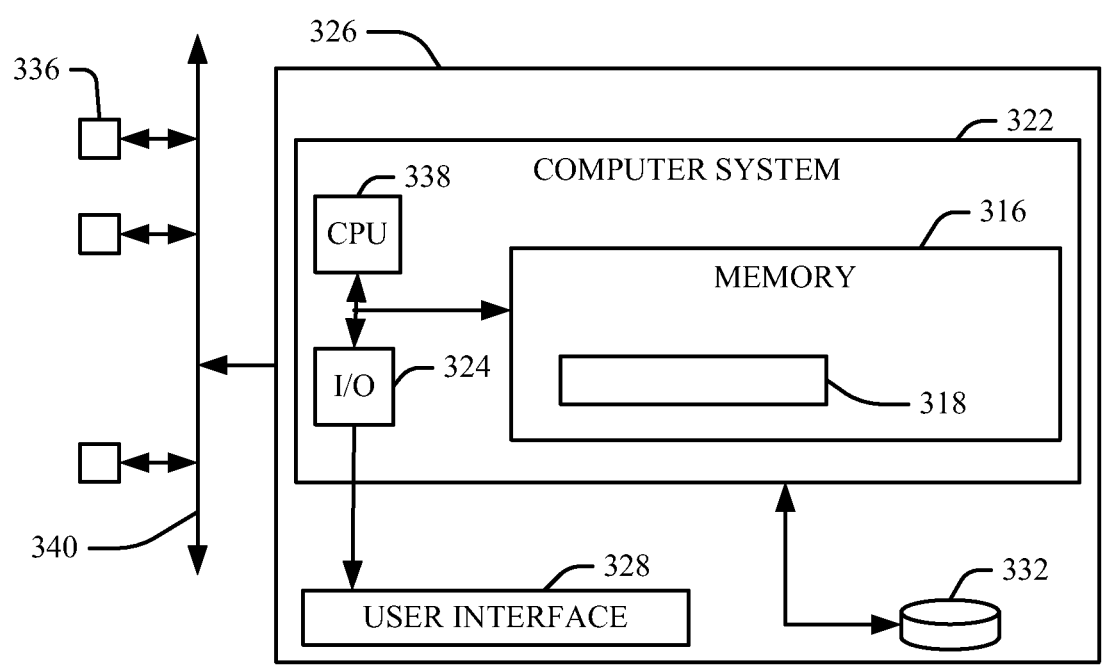
FIG. 3 is a computerized implementation of an embodiment of the present invention.

Referring now to FIG. 3, an exemplary computerized implementation of an embodiment of the present invention includes client computer or other programmable device 322 in communication with a user interface 328 and with one or more third party servers 336 accessible through an SSL or other secure web interface 340, for example in response to computer readable code 318 in a file residing in a memory 316 or a storage system 332 through a computer network infrastructure 326. The implementation is intended to demonstrate, among other things, that the present invention could be implemented within a network environment (e.g., the Internet, a wide area network (WAN), a local area network (LAN) or a virtual private network (VPN), etc.) Communication can occur via any combination of various types of communication links: for example, communication links can comprise addressable connections that may utilize any combination of wired and/or wireless transmission methods.

Where communications occur via the Internet, connectivity could be provided by conventional TCP/IP sockets-based protocol, and an Internet service provider could be used to establish connectivity to the Internet. Still yet, the network infrastructure 326 is intended to demonstrate that an application of an embodiment of the invention can be deployed, managed, serviced, etc. by a service provider who offers to implement, deploy, and/or perform the functions of the present invention for others.

The computer 322 comprises various components, some of which are illustrated within the computer 322. More particularly, as shown, the computer 322 includes a processing unit (CPU) 338 in communication with the memory 316 and with one or more external I/O devices/resources 324, user interfaces 328 and storage systems 332. In general, the processing unit 338 may execute computer program code, such as the code to implement one or more of the process steps illustrated in the Figures and described above, which may be stored in the memory 316 and/or external storage system 332 or user interface device 328.

The network infrastructure 326 is only illustrative of various types of computer infrastructures for implementing the invention. For example, in one embodiment, computer infrastructure 326 comprises two or more computing devices (e.g., a server cluster) that communicate over a network. Moreover, the computer 322 is only representative of various possible computer systems that can include numerous combinations of hardware. To this extent, in other embodiments, the computer 322 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Moreover, the processing unit 338 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations. Further, I/O interfaces 324 can comprise any system for exchanging information with one or more of the external device 328. Still further, it is understood that one or more additional components (e.g., system software, math co-processing unit, etc.), not shown, can be included in the computer 322.

One embodiment performs process steps of the invention on a subscription, advertising, and/or fee basis. That is, a service provider could offer to manage business processes by automatically selecting optimal fetch settings for each as a function of database query load and relational context. In this case, the service provider can create, maintain, and support, etc., a computer infrastructure, such as the network computer infrastructure 326 that performs the process steps of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for executing one or more of the processes, systems and articles to authenticate users of web-based applications to third party servers as described above. In this case, a computer infrastructure, such as the computer infrastructure 326, can be provided and one or more systems for performing the process steps of the invention can be obtained (e.g., created, purchased, used, modified, etc.) and deployed to the computer infrastructure. To this extent, the deployment of a system can comprise one or more of: (1) installing program code on a computing device, such as the computers/devices 322/336, from a computer-readable medium; (2) adding one or more computing devices to the computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automatically selecting optimal fetch settings for each of a plurality of business processes as a function of database query load and relational context, the method comprising:

identifying each of a plurality of data retrieval points enabled during a creation of a business process execution language process;

determining for each of the respective plurality of data retrieval points via a processor whether data loaded is dependent upon a query result from another query process;

automatically selecting an eager fetch setting for each of the plurality of data retrieval points dependent upon the query result from another query process, and selecting a lazy fetch setting for each of the plurality of data retrieval points that are not dependent upon a query result from another query process;

monitoring usage of the business process execution language process data retrieval points with respect to a defined unit of work and defining retrieval patterns for each of the data retrieval points as a function of the monitoring; and automatically updating the fetch settings as a function of the defined retrieval patterns by revising each of the selected eager fetch settings for the data retrieval points that have defined retrieval patterns that are larger than a permissible memory resource threshold to lazy fetch settings.

2. The method of claim 1, further comprising:

iteratively repeating for each of a plurality of periodic retraining periods the monitoring the usage of the business process execution language process data retrieval points with respect to the defined unit of work, the defining the retrieval patterns for each of the data retrieval points as the function of the monitoring and the automatically updating the fetch settings as the function of the defined retrieval patterns by revising each of the selected eager fetch settings for the data retrieval points that have defined retrieval patterns that are larger than the permissible memory resource threshold to lazy fetch settings.

3. The method of claim 2, further comprising automatically selecting the eager fetch setting for each of the plurality of data retrieval points dependent upon the query result from another query process if determined that a task always requires at least one additional query to acquire all information needed from a database.

4. The method of claim 3, further comprising:

predicting that a datasize of results from a selected eager fetch setting for one of the data retrieval points would be larger than the specified permissible memory resource threshold; and overriding an automatically selected eager fetch setting for the one data retrieval point and selecting instead the lazy fetch setting in response to the predicting that the datasize of results from the selected eager fetch setting for the one data retrieval point would be larger than the specified permissible memory resource threshold.

5. The method of claim 4, wherein the predicting that the datasize of results from a selected eager fetch setting for one of the data retrieval points would be larger than the specified permissible memory resource threshold comprises using a multilayer feed-forward neural network to predict future values based on training sets composed of historical data.

6. The method of claim 5, wherein the using the multilayer feed-forward neural network to predict future values based on training sets composed of historical data comprises:

collecting periodic resource demand statistics and compiling the collected periodic resource demand statistics over a specified historic timeframe;

translating the compiled periodic resource demand statistics into logged traffic load measurements and deriving associated demand requirements into an initial training data set comprising day and time statistics;

training a multilayer feed-forward neural network using the initial training data set;

using the trained multilayer feed-forward neural network to predict frequency patterns for each of the data retrieval points using the compiled periodic resource demand statistics over a previous specified timeframe;

assigning the predicted frequency patterns to each of the data retrieval points;

updating the initial training data set to contain statistics for a current time period; and periodically retraining the multilayer feed-forward neural network through a back-propagation learning algorithm and a nonlinear sigmoid activation function.

7. The method of claim 5, wherein the defined unit of work is an application session defined from an open method to a close method, the method further comprising:

capturing a thread stack trace at a point when the open method is invoked; and using the thread stack trace to uniquely identify and match a business process to tuned optimal settings calculated for it in the defined retrieval patterns.

8. The method of claim 5, further comprising:

automatically selecting a fetch setting for each of the plurality of data retrieval points or automatically updating the fetch settings as the function of the defined retrieval patterns by:

selecting a batch fetch setting or a join fetch setting.

9. A computer system for automatically selecting optimal fetch settings for each of a plurality of business processes as a function of database query load and relational context, the computer system comprising:
a processing unit, a computer readable memory and a computer readable storage system;
first program instructions to identify each of a plurality of data retrieval points enabled during a creation of a business process execution language process and determine for each of the respective plurality of data retrieval points whether data loaded is dependent upon a query result from another query process;
second program instructions to automatically select an eager fetch setting for each of the plurality of data retrieval points dependent upon the query result from another query process, and select a lazy fetch setting for each of the plurality of data retrieval points that are not dependent upon a query result from another query process;
third program instructions to monitor usage of the business process execution language process data retrieval points with respect to a defined unit of work, define retrieval patterns for each of the data retrieval points as a function of the monitoring and automatically update the fetch settings as a function of the defined retrieval patterns by revising each of the selected eager fetch settings for the data retrieval points that have defined retrieval patterns that are larger than a permissible memory resource threshold to lazy fetch settings;
wherein the first, second and third program instructions are stored on the computer readable storage system for execution by the processing unit via the computer readable memory.

10. The computer system of claim 9, wherein the second program instructions are further to automatically select the eager fetch setting for each of the plurality of data retrieval points dependent upon the query result from another query process if determined that a task always requires at least one additional query to acquire all information needed from a database; and
wherein the third program instructions are further to iteratively repeat for each of a plurality of periodic retraining periods the monitoring the usage of the business process execution language process data retrieval points with respect to the defined unit of work, the defining the retrieval patterns for each of the data retrieval points as the function of the monitoring and the automatically updating the fetch settings as the function of the defined retrieval patterns by revising each of the selected eager fetch settings for the data retrieval points that have defined retrieval patterns that are larger than the permissible memory resource threshold to lazy fetch settings.

11. The computer system of claim 9, wherein the second program instructions are further to:
predict that a datasize of results from a selected eager fetch setting for one of the data retrieval points would be larger than the specified permissible memory resource threshold; and
override an automatically selected eager fetch setting for the one data retrieval point and selecting instead the lazy fetch setting in response to the predicting that the datasize of results from the selected eager fetch setting for the one data retrieval point would be larger than the specified permissible memory resource threshold.

12. The computer system of claim 11, wherein the second program instructions are further to:
predict that the datasize of results from a selected eager fetch setting for one of the data retrieval points would be larger than the specified permissible memory resource threshold through using a multilayer feed-forward neural network to predict future values based on training sets composed of historical data by:
collecting periodic resource demand statistics and compiling the collected periodic resource demand statistics over a specified historic timeframe;
translating the compiled periodic resource demand statistics into logged traffic load measurements and deriving associated demand requirements into an initial training data set comprising day and time statistics;
training a multilayer feed-forward neural network using the initial training data set;
using the trained multilayer feed-forward neural network to predict frequency patterns for each of the data retrieval points using the compiled periodic resource demand statistics over a previous specified timeframe;
assigning the predicted frequency patterns to each of the data retrieval points;
updating the initial training data set to contain statistics for a current time period; and
periodically retraining the multilayer feed-forward neural network through a back-propagation learning algorithm and a nonlinear sigmoid activation function.

13. The computer system of claim 12, wherein the defined unit of work is an application session defined from an open method to a close method; and
wherein the second program instructions are further to capture a thread stack trace at a point when the open method is invoked and use the thread stack trace to uniquely identify and match a business process to tuned optimal settings calculated for it in the defined retrieval patterns.

14. The computer system of claim 12, wherein the first program instructions are further to automatically select a fetch setting for each of the plurality of data retrieval points, or the third program instructions are further to automatically update the fetch settings as the function of the defined retrieval patterns, by selecting a batch fetch setting or a join fetch setting.

15. A computer program product for automatically selecting optimal fetch settings for each of a plurality of business processes as a function of database query load and relational context, the computer program product comprising:
a computer readable storage device;
first program instructions to identify each of a plurality of data retrieval points enabled during a creation of a business process execution language process and determine for each of the respective plurality of data retrieval points whether data loaded is dependent upon a query result from another query process;
second program instructions to automatically select an eager fetch setting for each of the plurality of data retrieval points dependent upon the query result from another query process, and select a lazy fetch setting for each of the plurality of data retrieval points that are not dependent upon a query result from another query process;
third program instructions to monitor usage of the business process execution language process data retrieval points with respect to a defined unit of work, define retrieval patterns for each of the data retrieval points as a function of the monitoring and automatically update the fetch settings as a function of the defined retrieval patterns by revising each of the selected eager fetch settings for the data retrieval points that have defined retrieval patterns that are larger than a permissible memory resource threshold to lazy fetch settings;

wherein the first, second and third program instructions are stored on the computer readable storage device.

16. The computer program product of claim 15, wherein the second program instructions are further to:

automatically select the eager fetch setting for each of the plurality of data retrieval points dependent upon the query result from another query process if determined that a task always requires at least one additional query to acquire all information needed from a database;

predict that a datasize of results from a selected eager fetch setting for one of the data retrieval points would be larger than the specified permissible memory resource threshold; and override an automatically selected eager fetch setting for the one data retrieval point and selecting instead the lazy fetch setting in response to the predicting that the datasize of results from the selected eager fetch setting for the one data retrieval point would be larger than the specified permissible memory resource threshold; and wherein the third program instructions are further to iteratively repeat for each of a plurality of periodic retraining periods the monitoring the usage of the business process execution language process data retrieval points with respect to the defined unit of work, the defining the retrieval patterns for each of the data retrieval points as the function of the monitoring and the automatically updating the fetch settings as the function of the defined retrieval patterns by revising each of the selected eager fetch settings for the data retrieval points that have defined retrieval patterns that are larger than the permissible memory resource threshold to lazy fetch settings.

17. The computer program product of claim 16, wherein the second program instructions are further to:

predict that the datasize of results from a selected eager fetch setting for one of the data retrieval points would be larger than the specified permissible memory resource threshold through using a multilayer feed-forward neural network to predict future values based on training sets composed of historical data by:

collecting periodic resource demand statistics and compiling the collected periodic resource demand statistics over a specified historic timeframe;

translating the compiled periodic resource demand statistics into logged traffic load measurements and deriving associated demand requirements into an initial training data set comprising day and time statistics;

training a multilayer feed-forward neural network using the initial training data set;

using the trained multilayer feed-forward neural network to predict frequency patterns for each of the data retrieval points using the compiled periodic resource demand statistics over a previous specified timeframe;

assigning the predicted frequency patterns to each of the data retrieval points;

updating the initial training data set to contain statistics for a current time period; and periodically retraining the multilayer feed-forward neural network through a back-propagation learning algorithm and a nonlinear sigmoid activation function.

18. The computer program product of claim 17, wherein the defined unit of work is an application session defined from an open method to a close method; and wherein the second program instructions are further to capture a thread stack trace at a point when the open method is invoked and use the thread stack trace to uniquely identify and match a business process to tuned optimal settings calculated for it in the defined retrieval patterns.

19. The computer program product of claim 18, wherein the first program instructions are further to automatically select a fetch setting for each of the plurality of data retrieval points, or the third program instructions are further to automatically update the fetch settings as the function of the defined retrieval patterns, by selecting a batch fetch setting or a join fetch.

* * * * *